United States Patent
Khan. P et al.

(10) Patent No.: US 10,536,301 B2
(45) Date of Patent: Jan. 14, 2020

(54) METHODS AND APPARATUS FOR AN INTERFACE

(71) Applicant: SEMICONDUCTOR COMPONENTS INDUSTRIES, LLC, Phoenix, AZ (US)

(72) Inventors: Athar Ali Khan. P, Kanaka Nagar (IN); Manish Kumar Viswkarma, Bangalore (IN)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/283,951

(22) Filed: Feb. 25, 2019

(65) Prior Publication Data

US 2019/0386853 A1  Dec. 19, 2019

(30) Foreign Application Priority Data

Jun. 14, 2018 (IN) .............................. 201811022324

(51) Int. Cl.
| | |
|---|---|
| H03K 17/16 | (2006.01) |
| H03K 19/003 | (2006.01) |
| H04L 25/02 | (2006.01) |
| H04L 5/14 | (2006.01) |

(52) U.S. Cl.
CPC .............. H04L 25/028 (2013.01); H04L 5/14 (2013.01); H04L 25/0292 (2013.01)

(58) Field of Classification Search
None
See application file for complete search history.

(56) References Cited

U.S. PATENT DOCUMENTS

| | | | | |
|---|---|---|---|---|
| 6,356,582 B1 * | 3/2002 | Mazer | ................ | G06F 13/4072 375/219 |
| 8,619,838 B2 * | 12/2013 | Hao | ........................ | H05C 3/00 256/10 |
| 8,645,724 B2 | 2/2014 | Jaramillo | | |
| 2010/0135370 A1 | 6/2010 | Best | | |
| 2010/0250820 A1 * | 9/2010 | Gaalaas | .............. | G06F 13/4072 710/305 |
| 2015/0149671 A1 | 5/2015 | Rohr | | |

OTHER PUBLICATIONS

Texas Instruments, TUSB544 USB Type-C 8.1 Gbps Multi-Protocol Linear Redriver, data sheet, Apr. 2018, Texas Instruments Incorporated.
Texas Instruments, TUSB546-DCI USB Type-C DP ALT Mode Linear Redriver Crosspoint Switch, data sheet, Apr. 2018, Texas Instruments Incorporated.
Texas Instruments, TUSB1046-DCI USB Type-C DisplayPort ALT Mode 10 Gbps Linear Redriver Crosspoint Switch, data sheet, Apr. 2018, Texas Instruments Incorporated.

* cited by examiner

*Primary Examiner* — Anh Q Tran
(74) *Attorney, Agent, or Firm* — The Noblitt Group, PLLC; Hettie L. Haines (57) ABSTRACT

Various embodiments of the present technology may provide methods and apparatus for an interface. The interface may be configured as a low-voltage, bi-directional channel redriver having a transmitter and a receiver that share input pads and output pads. The interface may provide for selective biasing of the transmitter and receiver using a switching circuit and a resistance circuit connected to the channel's input and output pads.

19 Claims, 8 Drawing Sheets

METHODS AND APPARATUS FOR AN INTERFACE

CROSS-REFERENCE TO RELATED APPLICATION

This application is based on and claims the benefit of India Provisional Application No. 201811022324, filed on Jun. 14, 2018, the contents of which are incorporated by reference.

BACKGROUND OF THE TECHNOLOGY

Many electrical systems utilize an interface to receive and/or transmit data between a host device and a sink device. Conventional interfaces operate with a supply voltage of 3.3 volts and may perform at a rate of 10 Gbps. However, in an effort to improve battery life, an interface that operates a lower voltage, such as 1.8 volts, may be desired. It may also be desired to provide an interface with a bi-directional channel that shares the input/output pads. Conventional interfaces that share input/output pads, however, may experience decreased performance (lower rates of transmission/reception) due to challenges in biasing the interface. Accordingly, it may be desired to provide a high-speed, low-voltage supply, bi-directional channel interface that share the input/output pads.

SUMMARY OF THE INVENTION

Various embodiments of the present technology may provide methods and apparatus for an interface. The interface may be configured as a low-voltage, bi-directional channel redriver having a transmitter and a receiver that share input pads and output pads. The interface may provide for selective biasing of the transmitter and the receiver using a switching circuit and a resistance circuit connected to the channel's input and output pads.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various filters, amplifiers, transistors, resistive elements, switching devices, and the like, which may carry out a variety of functions. In addition, the present technology may be practiced in conjunction with any number of electronic systems, such as automotive, aviation, "smart devices," portables, and consumer electronics, and the systems described are merely exemplary applications for the technology.

Methods and apparatus for an interface according to various aspects of the present technology may operate in conjunction with any suitable communication system. For example, and referring to FIG. 1, an exemplary system 100 may comprise a host device 105 (i.e., a source device), an interface circuit 110, and a sink device 115. According to an exemplary embodiment, the host device 105 and interface circuit 110 are connected by a transmission line, such as a first transmission line 120 and a second transmission line 125, and a coupling capacitor, such as coupling capacitors C1, C2. Furthermore, the interface circuit 110 and the sink device 115 may be connected by a transmission line, such as a third transmission line 130 and a fourth transmission line 135, and a coupling capacitor, such as coupling capacitors C3, C4. Accordingly, the host device 105 and the sink device 115 are connected to each other via the interface circuit 110. The transmission lines may comprise any suitable communication lines, buses, links, wires, cables, and the like for transferring data.

Figure 1:
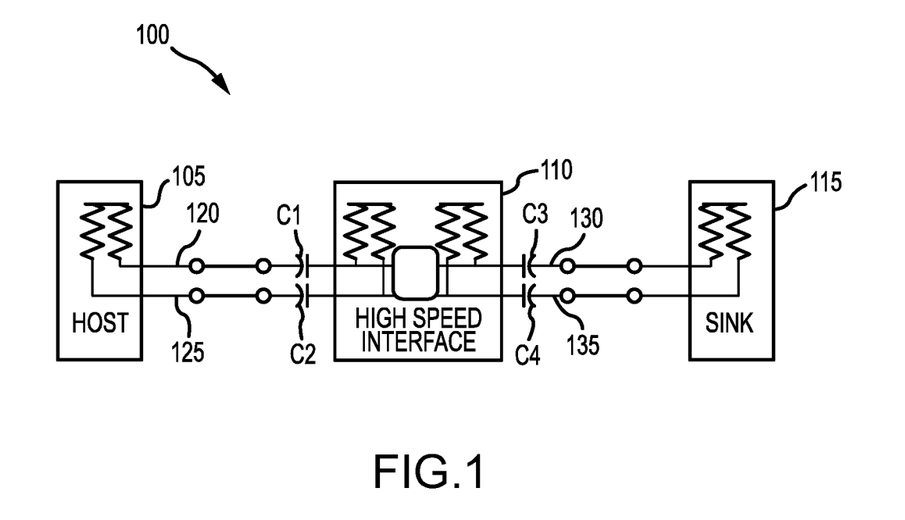
FIG. 1 is a block diagram of a system in accordance with an exemplary embodiment of the present technology.

The interface circuit 110 may provide high-speed communication (data transmission) at a low voltage using shared input/output (I/O) pads. For example, the interface circuit 110 may be configured to perform at 1.8 volts for data rates of 5 Gbps (gigabits per second), 8.1 Gbps, and 10 Gbps. The interface circuit 110 may be capable of operating according to USB 3.1 SuperSpeed Plus protocol, for example completing related transmission and reception compliance testing at 10 Gbps. According to an exemplary embodiment, the interface circuit 110 may be implemented as a linear redriver for multi-protocol applications, such as USB and/or DisplayPort. According to various embodiments, the interface circuit 110 may selectively bias various terminals to achieve a desired operation. According to various embodiments, the interface circuit 110 may operate according to various modes, such as a high-speed mode and a power-saving mode.

Referring to FIGS. 1, 2, and 4-8, various embodiments of the interface circuit 110 may comprise a channel connected to a first pair of I/O pads 210 and a second pair of I/O pads 215. Each pair of I/O pads 210, 215 may comprise two I/O pads. For example, the first pair of I/O pads 210 comprises a first I/O pad 220 and a second I/O pad 225. Similarly, the second pair of I/O pads 215 comprises a third I/O pad 230 and a fourth I/O pad 235. The first and second pairs of I/O pads 210, 215 may be used to connect the host device 105 and the sink device 115 to the interface circuit 110. For example, the first pair of I/O pads 210 may connect the host device 105 to the interface circuit 110 and the second pair of I/O pads 215 may connected the sink device 115 to the interface circuit 110.

The channel may be configured to transmit and/or receive data. For example, in various embodiments, and referring to FIGS. 2 and 4-6, the channel may be configured as a bi-directional channel comprising an independent transmitter 200 and an independent receiver 205 connected in parallel with each other. In such an arrangement, input terminals of the transmitter 200 and output terminals of the receiver 205 are connected to each other and share the first pair of I/O pads 210. Similarly, output terminals of the transmitter 200 and input terminals of the receiver 205 are connected to each other and share the second pair of I/O pads 215.

Figure 7:
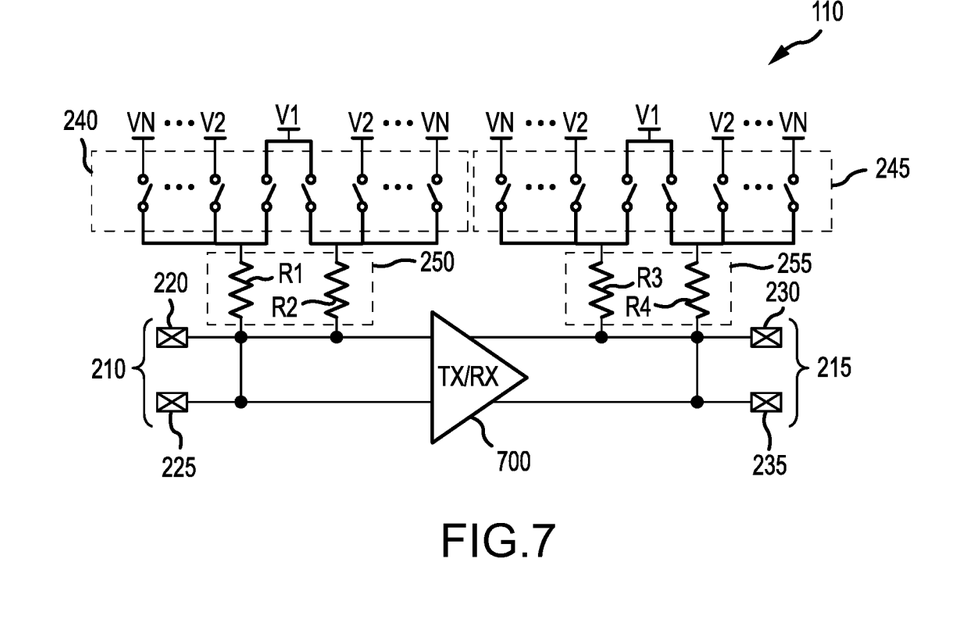
FIG. 7 is a circuit diagram of an interface in accordance with a fifth embodiment the present technology.
Figure 8:
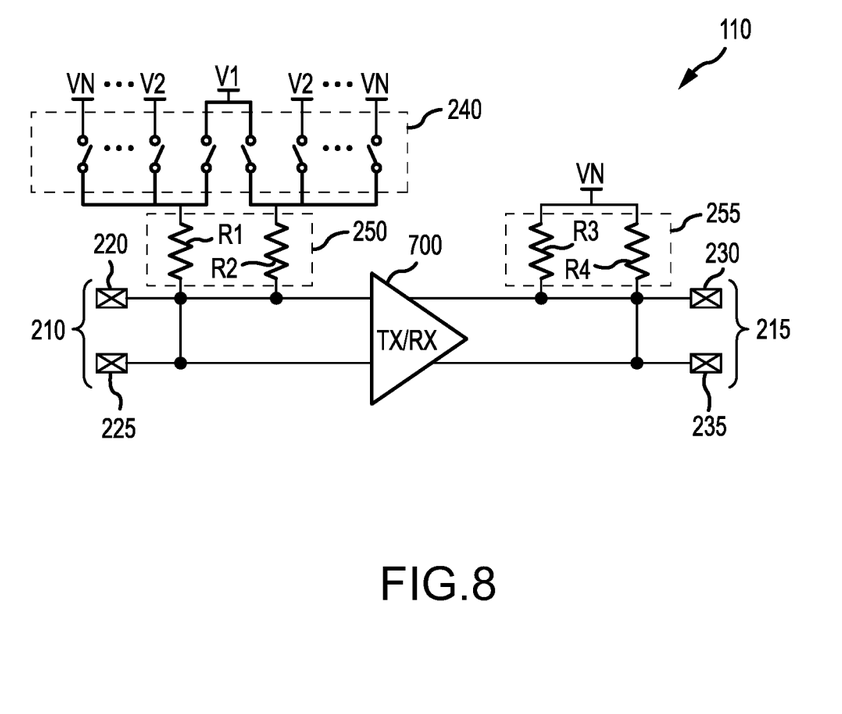
FIG. 8 is a circuit diagram of an interface in accordance with a sixth embodiment the present technology.

In alternative embodiments, and referring to FIGS. 7 and 8, the channel may be configured as a uni-directional channel comprising a single transmitter/receiver, such as a transmitter/receiver circuit 700. In such an arrangement, output terminals of the transmitter/receiver circuit 700 may be connected to the first pair of I/O pads 210 and the output terminals of the transmitter/receiver circuit 700 may be connected to the second pair of I/O pads 215.

In yet other embodiments, each terminal of the transmitter 200 and each terminal of the receiver 205 may be connected to independent I/O pads (i.e., no sharing of I/O pads).

Figure 2:
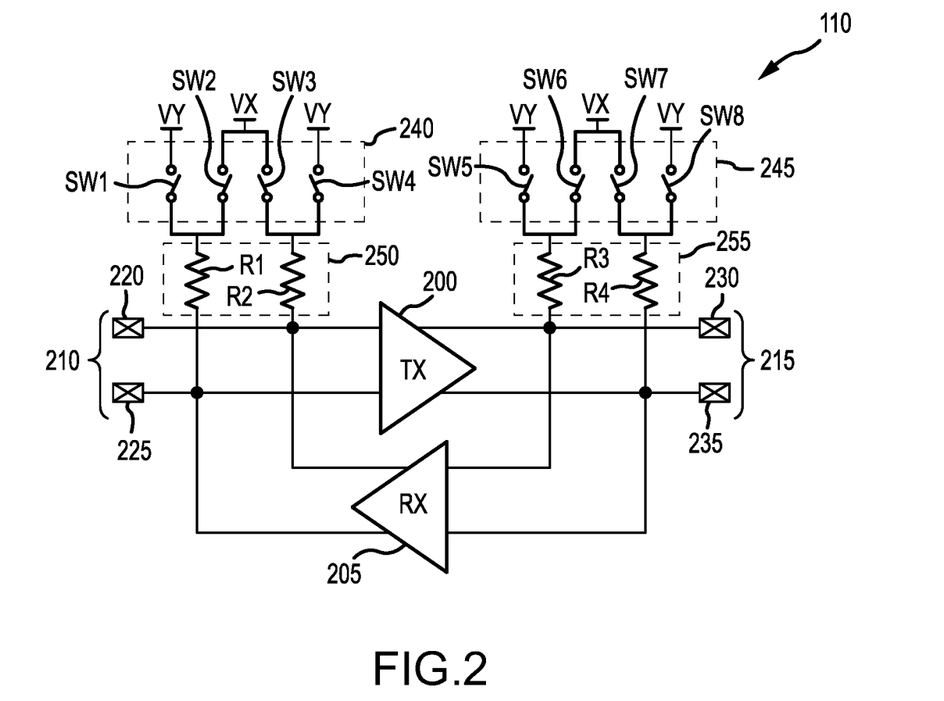
FIG. 2 is a circuit diagram of an interface in accordance with a first embodiment of the present technology.
Figure 3:
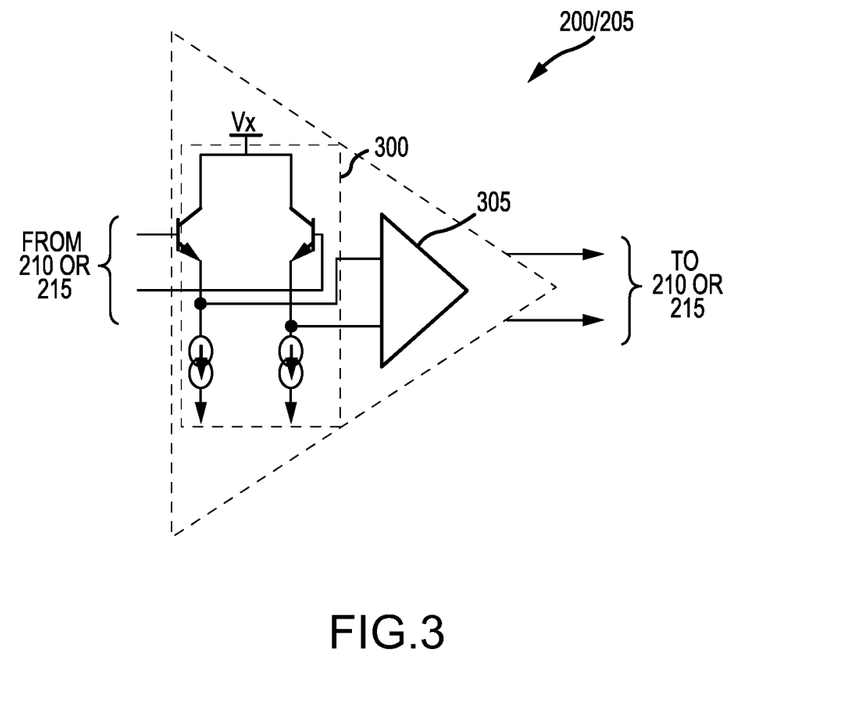
FIG. 3 is a circuit diagram of a transmitter or a receiver in accordance with various embodiments of the present technology.
Figure 4:
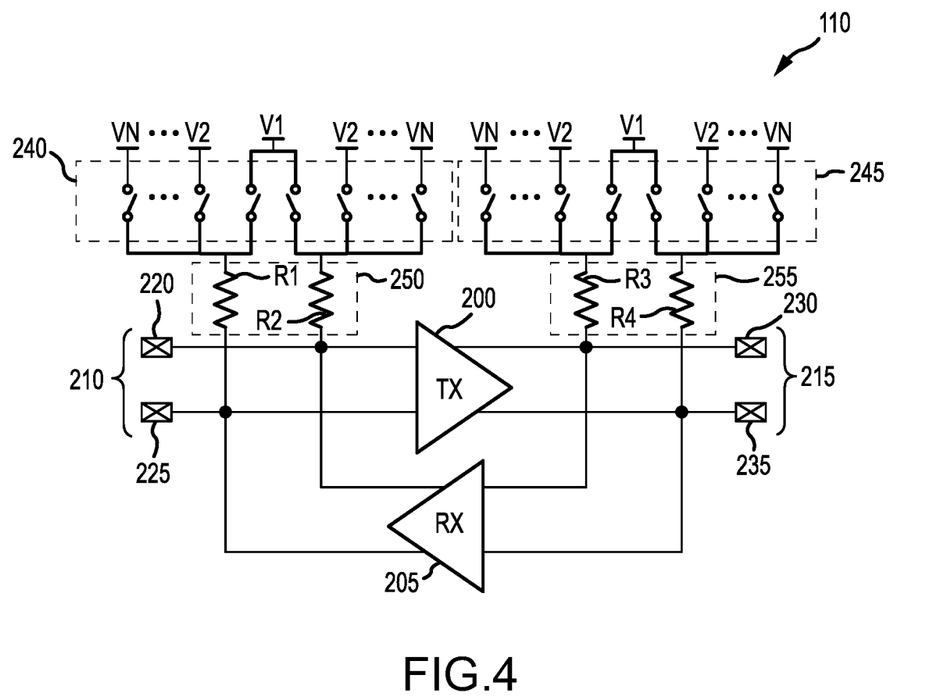
FIG. 4 is a circuit diagram of an interface in accordance with a second embodiment of the present technology.
Figure 5:
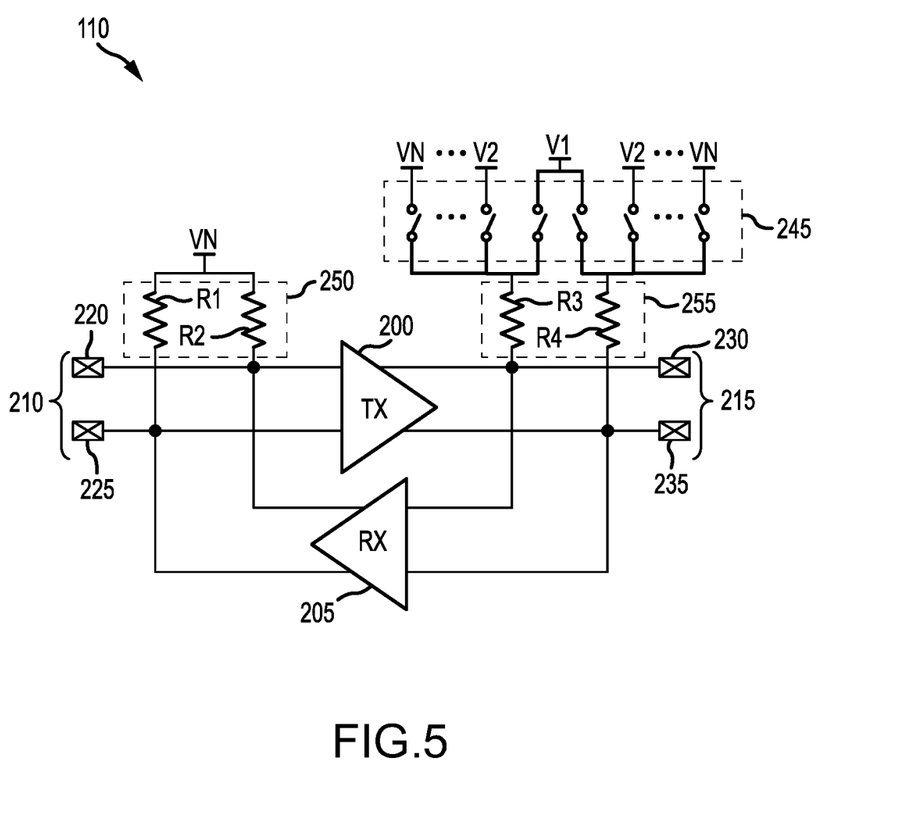
FIG. 5 is a circuit diagram of an interface in accordance with a third embodiment of the present technology.
Figure 6:
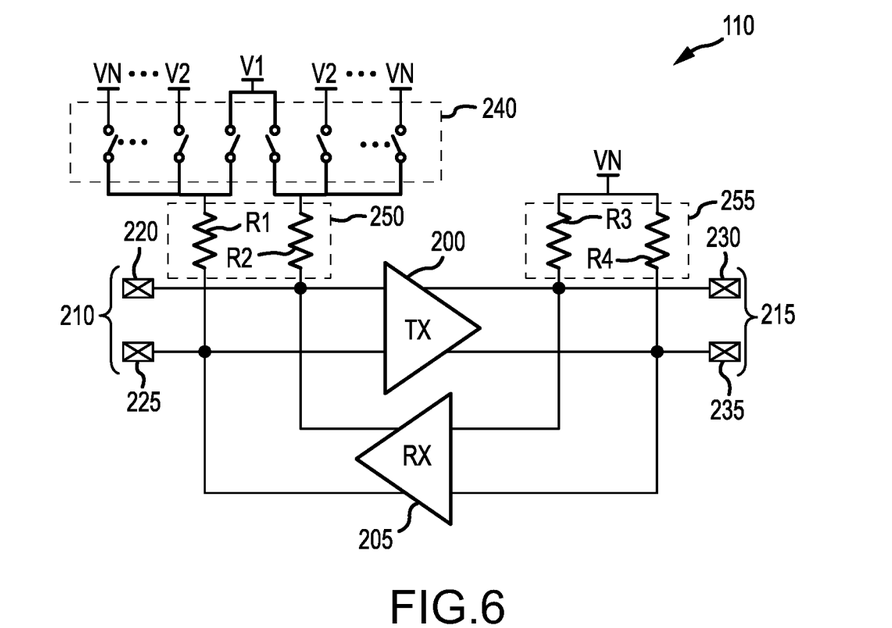
FIG. 6 is a circuit diagram of an interface in accordance with a fourth embodiment the present technology.

Referring to FIGS. 2, 3, and 7, the transmitter 200, the receiver 205, and/or the transmitter/receiver circuit 700 may comprise a level-shifting circuit 300 connected to a buffer 305. The level-shifting circuit 300 may comprise a plurality of transistors connected to a plurality of current sources and a voltage source, such as voltage source Vx. To achieve high-speed operation of the channel, the transistors must operate in an active mode (i.e., active region), wherein the transistor acts as a fairly linear amplifier. The voltage source Vx operates to maintain the active mode in the transistors.

According to various embodiments, and referring to FIGS. 2 and 4-8, the interface circuit 110 may further comprise a plurality of resistance circuits, such as a first resistance circuit 250 and a second resistance circuit 255. According to various embodiments, the first resistance circuit 250 may be connected to the first pair of I/O pads 210 and used to control biasing of the transmitter 200 and/or the receiver 205 (or the transmitter/receiver circuit 700). Similarly, the second resistance circuit 255 may be connected to the second pair of I/O pads 215 and used to control the biasing of the transmitter 200 and/or the receiver 205 (or the transmitter/receiver circuit 700). In other words, the first resistance circuit 250 may be shared by the transmitter 200 and the receiver 205 and used to bias the first pair of I/O pads 201 and the second resistance circuit 255 may be shared by the transmitter 200 and the receiver 205 and used to bias the second pair of I/O pads 215.

Each resistance circuit 250, 255 may comprise a plurality of resistive elements. The resistive elements may comprise any suitable element for reducing current and/or voltage and may comprise passive components, such as resistors, and/or active components. For example, the first resistance circuit 250 may comprise a first resistor R1 and a second resistor R2. The first resistor R1 may be connected to the second I/O pad 225, a second input terminal of the transmitter 200, and a second output terminal of the receiver 205 via a first node. The second resistor R2 may be connected to the first I/O pad 220, a first input terminal of the transmitter 200, and a first output terminal of the receiver 205 via a second node.

Similarly, the second resistance circuit 255 may comprise a third resistor R3 and a fourth resistor R4. The third resistor R3 may be connected to the third I/O pad 230, a first output terminal of the transmitter 200, and a first input terminal of the receiver 205 via a third node. The fourth resistor R4 may be connected to the fourth I/O pad 235, a second output terminal of the transmitter 200, and a second input terminal of the receiver 205 via a fourth node.

According to various embodiments, sharing of the first resistance circuit 250 by the transmitter 200 and the receiver 205 may result in less parasitics at the first pair of I/O pads 210 allowing for improved (higher speed) performance, improved return loss, and increased bandwidth. Similarly, sharing of the second resistance circuit 255 by the transmitter 200 and the receiver 205 may result in less parasitics at the second pair of I/O pads 215 allowing for improved (higher speed) performance, improved return loss, and increased bandwidth. The resistance circuits 250, 255 may be formed on a same chip as the channel or on a companion chip.

The interface circuit 110 may further comprise at least one switching circuit to selectively bias the interface circuit 110 by applying a particular voltage to the input and/or output terminals of the channel. For example, in various embodiments, the interface circuit 110 may comprise a first switching circuit 240 connected to the first resistance circuit 250 and a second switching circuit 245 connected to the second resistance circuit 255. In alternative embodiments, the interface circuit 110 may comprise only one of the first and second switching circuits 240, 245.

In various embodiments, each switching circuit 240, 245 may also be connected to a plurality of supply voltages (e.g., VX, VY, V1, V2 . . . VN), wherein each voltage is different (i.e., VX≠VY, V1≠V2, V1≠VN, etc.). The plurality of supply voltages may be generated using any suitable circuit and/or system and may be generated on the same chip as the channel or a companion chip.

Each switching circuit 240, 245 may comprise a plurality of switching devices to selectively connect a voltage from the plurality of supply voltages to the corresponding input/output terminals of the transmitter 200 and the receiver 205 via the corresponding resistance circuit. For example, the first resistor R1 may be selectively connected to a first voltage VX and a second voltage VY via a second switching device SW2 and a first switching device SW1, respectively. Similarly, the second resistor R2 may be selectively connected to the first voltage VX and the second voltage VY via a third switching device SW3 and a fourth switching device SW4, respectively. Accordingly, each switching device is connected in series with the respective resistor.

In various embodiments comprising the second switching circuit 245, the third resistor R3 may be selectively connected to the first voltage VX and the second voltage VY via a sixth switching device SW6 and a fifth switching device SW5, respectively. Similarly, the fourth resistor R4 may be selectively connected to the first voltage VX and the second voltage VY via a seventh switching device SW7 and a eighth switching device SW8, respectively.

In other embodiments, each switching circuit 240, 245 may be connected to more than two voltages, such as a first voltage V1, a second voltage V2, and an nth voltage VN. According to the present embodiments, three or more switching devices may be used to selectively connect a single voltage to each resistor (e.g., R1, R2, R3, R4).

According to various embodiments, the each switching device (e.g., SW1: SW8) may comprise any device and/or circuit suitable for controlling current flow, such as a bipolar junction transistor or a metal-oxide-semiconductor transistor. Each switching device may be operated according to a control signal (not shown) generated by a control circuit (not shown). The switching circuits 240, 245 may be formed on the same chip as the channel or on a companion chip.

In operation, the interface 110 transmits data to/from the host device 105 and the sink device 115 using the channel and the I/O pads (e.g., I/O pads 220, 225, 230, 235). Biasing the channel and the I/O pads 220, 225, 230, 235 allows the interface 110 to operate at high-speed (e.g., 10 Gbps) and at a low-voltage (e.g., 1.8V). In addition, selective biasing allows the interface 110 to operate in the high-speed mode and the power-saving mode.

Figure 9:
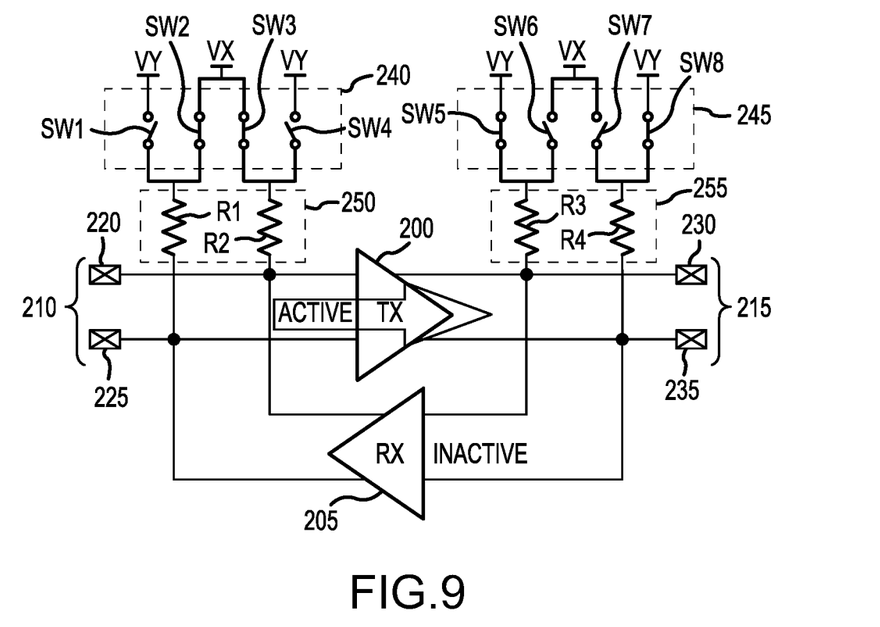
FIG. 9 is the circuit diagram of the interface of FIG. 2 operating a transmitter in a high-speed mode and in accordance with the present technology.
Figure 11:
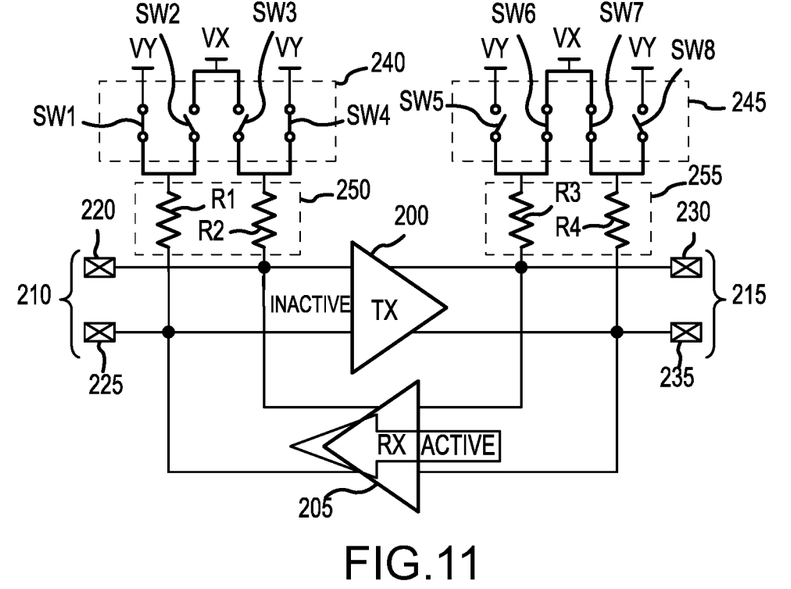
FIG. 11 is the circuit diagram of the interface of FIG. 2 operating a receiver in a high-speed mode and in accordance with the present technology.

Referring to FIGS. 9 and 11, in exemplary high-speed mode of operation, the transmitter 200 may be activated (active) by biasing the input and output terminals of the transmitter 200 as well as the I/O pads 220, 225, 230, 235. For example, at the input terminals of the transmitter 200, switching devices SW2 and SW3 may be closed (ON) to connect the first voltage VX to the first resistance circuit 250, while switching devices SW1 and SW4 may be open (OFF). Accordingly, the first pair of I/O pads 210 has a first voltage. At the output terminals of the transmitter 200, switching devices SW5 and SW8 are closed (ON) to connect the second voltage VY to the second resistance circuit 255, while switching devices SW6 and SW7 are open (OFF). Accordingly, the second pair of I/O pads 215 has a second voltage. During the time when the transmitter 200 is active, the receiver 205 is inactive.

Similarly, the receiver 205 may be activated (active) by biasing the input and output terminals of the receiver 205 as well as the I/O pads 220, 225, 230, 235. For example, at the input terminals of the receiver 205, switching devices SW1 and SW4 may be closed (ON) to connect the second voltage VY to the first resistance circuit 250, while switching devices SW2 and SW3 may be open (OFF). Accordingly, the first pair of I/O pads 210 has the second voltage. At the output terminals of the receiver 205, switching devices SW6 and SW7 are closed (ON) to connect the first voltage VX to the second resistance circuit 255, while switching devices SW5 and SW8 are open (OFF). Accordingly, the second pair of I/O pads 215 has the first voltage. During the time when the receiver 205 is active, the transmitter 200 is inactive.

Figure 10:
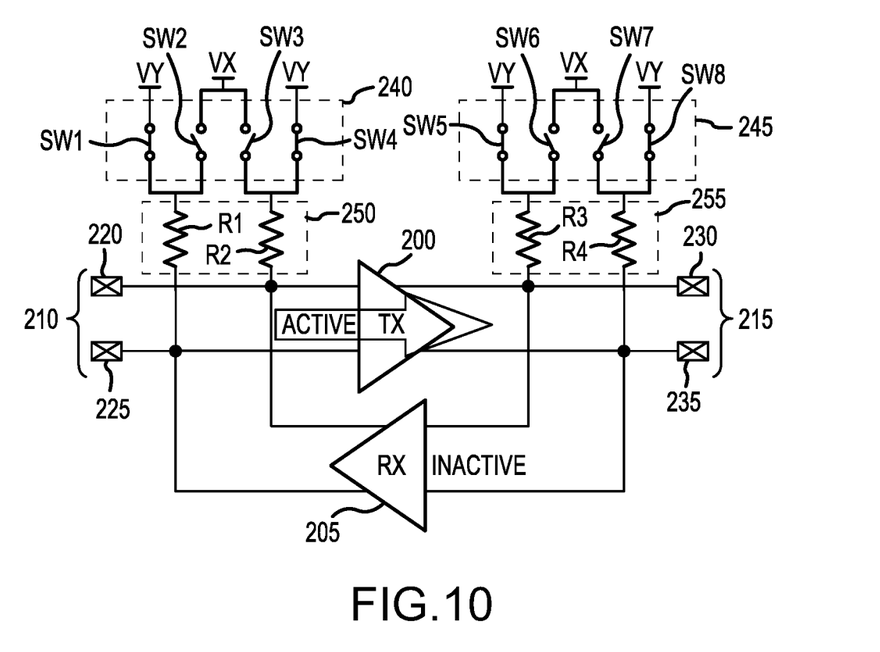
FIG. 10 is the circuit diagram of the interface of FIG. 2 operating the transmitter in a power-saving mode and in accordance with the present technology.
Figure 12:
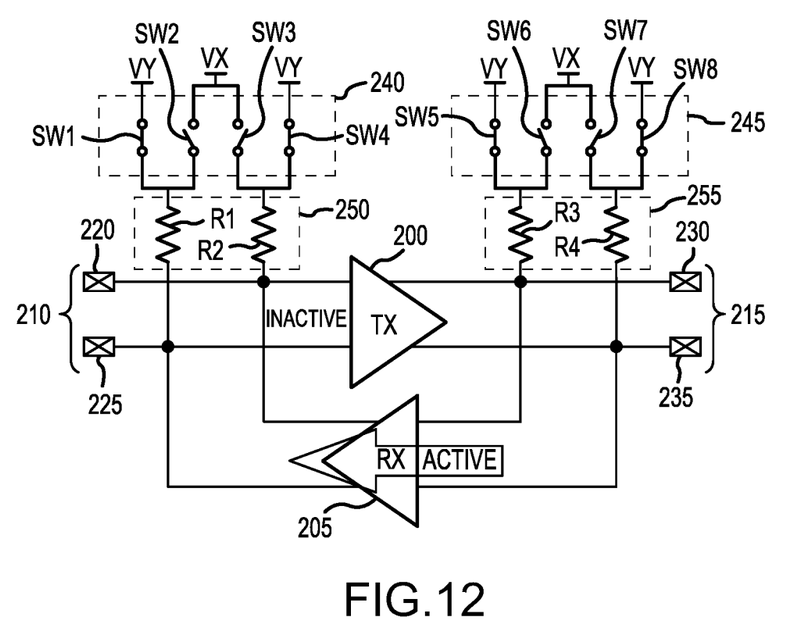
FIG. 12 is the circuit diagram of the interface of FIG. 2 operating the receiver in a power-saving mode and in accordance with the present technology.

Referring to FIGS. 10 and 12, in an exemplary power-saving mode of operation, both the transmitter 200 and the receiver 205 may enter the power-saving mode by biasing the input and output terminals of the transmitter 200 and the receiver 205 as well as the I/O pads 220, 225, 230, 235. For example, switching devices SW1 and SW4 may be closed (ON) to connect the second voltage VY to the first resistance circuit 250, while switching devices SW2 and SW3 may be open (OFF). Switching devices SW5 and SW8 are closed (ON) to connect the second voltage VY to the second resistance circuit 255, while switching devices SW6 and SW7 are open (OFF). Accordingly, during the power-saving mode, both the first and second pairs of I/O pads 210, 215 have a same voltage.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An interface circuit, comprising:
   a receiver connected to a transmitter;
   a first pair of I/O pads connected to:
      an input of the receiver;
      an output of the transmitter; and
      a first resistance circuit;
   a second pair of I/O pads connected to:
      an output of the receiver;
      an input of the transmitter; and
      a second resistance circuit; and at least one switching circuit connected to one of the first and second resistance circuits;
wherein the at least one switching circuit is connected to a plurality of voltages.

2. The interface circuit according to claim 1, wherein each of the first and second resistance circuits comprises a plurality of resistors.

3. The interface circuit according to claim 1, wherein each of the first and second switching circuits comprises a plurality of switching devices.

4. The interface circuit according to claim 1, wherein:
the first resistance circuit is directly connected to:
a first I/O pad from the first pair of I/O pads; and
a second I/O pad from the first pair of I/O pads; and
the second resistance circuit is directly connected to:
a first I/O pad from the second pair of I/O pads; and
a second I/O pad from the second pair of I/O pads.

5. The interface circuit according to claim 1, wherein each voltage from the plurality of voltages is less than 3.0 volts.

6. The interface circuit according to claim 1, further comprising:
a first switching circuit connected to the first pair of I/O pads via the first resistance circuit; and
a second switching circuit connected to the second pair of I/O pads via the second resistance circuit;
wherein each switching circuit is:
connected to the plurality of voltages; and
selectively operable to apply:
a first voltage to the first pair of I/O pads; and
a second voltage to the second pair of I/O pads.

7. The interface circuit according to claim 6, wherein:
the first switching circuit is configured to selectively connect a first voltage from the plurality of voltages to the first pair of I/O pads via the first resistance circuit; and
the second switching circuit is configured to selectively connect a second voltage from the plurality of voltages to the second pair of I/O pads via the second resistance circuit;
wherein the second voltage is different from the first voltage.

8. The interface circuit according to claim 7, wherein:
the first resistance circuit comprises:
a first resistive element connected between a second I/O pad from the first pair of I/O pads and the first switching circuit; and
a second resistive element connected between a first I/O pad from the first pair of I/O pads and the first switching circuit; and
the second resistance circuit comprises:
a third resistive element connected between a first I/O pad from the second pair of I/O pads and the second switching circuit; and
a fourth resistive element connected between a second I/O pad from the second pair of I/O pads and the second switching circuit.

9. The interface circuit according to claim 1, wherein:
the first resistance circuit comprises:
a first resistive element directly connected to a second I/O pad from the first pair of I/O pads; and
a second resistive element directly connected to a first I/O pad from the first pair of I/O pads; and
the second resistance circuit comprises:
a third resistive element directly connected to a first I/O pad from the second pair of I/O pads; and
a fourth resistive element directly connected to a second I/O pad from the second pair of I/O pads.

10. A method for operating an interface circuit, comprising:
during a first mode:
applying a first voltage to a first pair of I/O pads via a first resistance circuit;
applying a second voltage to a second pair of I/O pads via a second resistance circuit, wherein the second voltage is different from the first voltage; and
during a second mode:
applying the second voltage to the first pair of I/O pads via the first resistance circuit; and
applying the second voltage to the second pair of I/O pads via the second resistance circuit;
wherein:
the first resistance circuit comprises:
a first resistive element connected to a second I/O pad from the first pair of I/O pads; and
a second resistive element connected to a first I/O pad from the first pair of I/O pads; and
the second resistance circuit comprises:
a third resistive element connected to a first I/O pad from the second pair of I/O pads; and
a fourth resistive element connected to a second I/O pad from the second pair of I/O pads.

11. The method according to claim 10, wherein applying the first voltage to the first pair of I/O pads comprises selectivity operating a first switching device connected to the first resistance circuit.

12. The method according to claim 10, wherein applying the second voltage to the second pair of I/O pads comprises selectively operating a second switching device connected to the second resistance circuit.

13. The method according to claim 10, wherein the interface is configured as a bi-directional channel comprising a transmitter connected to and in parallel with a receiver.

14. The method according to claim 10, wherein the first and second voltages are less than 3.0 volts.

15. The method according to claim 10, wherein the interface is configured as a uni-directional channel comprising one of: a transmitter and a receiver.

16. A system, comprising:
a host device connected to a sink device via an interface circuit, wherein the interface circuit comprises:
a bi-directional channel comprising:
a receiver;
a transmitter connected to the receiver;
a first pair of I/O pads shared by an input of the receiver and an output of the transmitter; and
a second pair of I/O pads shared by an output of the receiver and an input of the transmitter;
a first resistance circuit connected to the first pair of I/O pads;
a first switching circuit connected to the first resistance circuit and configured to selectively apply a first voltage to the first pair of I/O pads;
a second resistance circuit connected to the second pair of I/O pads; and
a second switching circuit connected to the second resistance circuit and configured to selectively apply a second voltage, which is different from the first voltage, to the second pair of I/O pads.

17. The system according to claim 16, wherein:
the first resistance circuit comprises:
a first resistive element directly connected to a second I/O pad from the at least one pair of I/O pads; and
a second resistive element directly connected to a first I/O pad from the at least one pair of I/O pads.

18. The system according to claim 16, wherein:
the first switching circuit is connected to a plurality of voltages;
the first switching device comprises a plurality of switching devices; and
each switching device from the plurality of switching devices connects one voltage from the plurality of voltages to the first resistance circuit.

19. The system according to claim 16, wherein the host device is connected to the interface circuit via a first transmission line; and the sink device is connected to the interface via a second transmission line.

* * * * *